United States Patent [19]

Kuwahara et al.

[11] Patent Number: 5,271,479
[45] Date of Patent: Dec. 21, 1993

[54] TRANSFER APPARATUS FOR A VEHICLE

[75] Inventors: Wataru Kuwahara; Masaru Shiraishi, both of Hatsukaichi; Ethuo Shirai, Hiroshima, all of Japan

[73] Assignee: Mazda Motor Corporation, Hiroshima, Japan

[21] Appl. No.: 859,761

[22] Filed: Mar. 30, 1992

[30] Foreign Application Priority Data

Mar. 29, 1991 [JP] Japan .................. 3-065848

[51] Int. Cl.$^5$ ............................................. B60K 17/35
[52] U.S. Cl. ...................... 180/249; 192/57; 475/231; 475/239
[58] Field of Search ............... 180/248, 249, 250; 192/57; 475/230, 231, 237, 238, 239

[56] References Cited

U.S. PATENT DOCUMENTS

| | | | |
|---|---|---|---|
| 2,228,581 | 1/1941 | Olen | 180/250 X |
| 2,383,873 | 8/1945 | MacPherson | 180/250 X |
| 3,848,691 | 11/1974 | Dolan | 180/250 |
| 3,869,940 | 3/1975 | Webb et al. | 180/249 X |
| 3,923,113 | 12/1975 | Pagdin | 180/44 R |
| 4,077,279 | 3/1978 | Goscenski, Jr. | 475/231 |

FOREIGN PATENT DOCUMENTS 0305031 12/1988 Japan .................. 180/249
1-164629 6/1989 Japan .

Primary Examiner—Sherman D. Basinger
Attorney, Agent, or Firm—Keck, Mahin & Cate

[57] ABSTRACT

A transfer apparatus for a vehicle has an input shaft which is connected to pinion shafts so as to rotate together with the pinion shafts in a transfer casing. Pinion gears, provided on the pinion shafts, mesh with first and second differential side gears provided around the input shaft. A first output shaft is formed as a unitary body with the first differential side gear. Since a clutch mechanism is disposed on one side of and beside the first output shaft, the entire transfer apparatus structure is compact in both axial and radial directions of the input shaft. The second differential side gear is connected to a sprocket, which connected to a second output shaft. In order to transfer rotation of either the input shaft or the second differential side gear to the clutch mechanism, either a differential casing or a portion extending from the sprocket is provided so as to connect with the clutch mechanism. A bearing providing stable support is provided around the differential casing so as to enable the differential casing to rotate.

16 Claims, 6 Drawing Sheets

TRANSFER APPARATUS FOR A VEHICLE

BACKGROUND OF THE INVENTION

1. Field of the Invention

This invention relates to a transfer apparatus which transmits drive power from an engine of a vehicle to a front wheel, a rear wheel, or both a front wheel and a rear wheel of the vehicle. More particularly, the invention relates to a transfer apparatus equipped with a differential mechanism in which an input shaft and a plurality of pinion shafts are connected to each other.

2. Description of Related Art

In four-wheel-drive vehicles, transfer apparatuses equipped with center differential lock mechanisms have previously been used for transmitting drive power from engines to front and rear wheels. Transfer apparatuses which employ differential mechanisms having bevel gearing in order to reduce their sizes in radial directions are described, for example, in U.S. Pat. No. 3,923,113 and Japanese Unexamined Patent Publication No. 1-164,629. By using a differential mechanism having bevel gearing, the size of the mechanism, in a radial direction thereof, can be reduced as compared to a center differential mechanism having planetary gearing. Moreover, when a speed differential arises between the front and rear wheels, the speed differential is absorbed by the center differential mechanism, so that the occurrence of slip is effectively prevented.

However, by using a differential mechanism having bevel gearing, even though the size of the mechanism in its radial direction is reduced, its size in the axial direction is large or long. This is because in the center differential mechanism, a sprocket for transmitting drive power to the front wheels of the vehicle, a center differential lock mechanism and a differential limit mechanism are disposed, in this order, in the axial direction. As a result, it is difficult to obtain an overall compact transfer apparatus structure.

In another previously known transfer apparatus, a clutch mechanism, forming at least part of a differential limit mechanism for limiting a speed differential between the front and rear wheels, is provided at the periphery of a bevel gear. This is because the clutch mechanism is provided between differential side gears which mesh with differential pinion gearing provided at a pinion shaft. Consequently, because the clutch mechanism is provided, the size of the transfer apparatus, in a radial direction, becomes larger than is acceptable. As a result, it is difficult to obtain a compact apparatus.

Additionally, since the clutch mechanism is inevitably provided at the periphery of the bevel gear, it is also difficult to support an input shaft within a transfer casing. This can cause the input shaft to be unstably supported.

SUMMARY OF THE INVENTION

It is one object of this invention to provide a transfer apparatus for a vehicle which is compact in not only a radial direction but also in an axial direction, even though it includes a clutch mechanism.

It is another object of this invention to provide a transfer apparatus for a vehicle in which an input shaft is stably supported and rotated, even though it is equipped with a clutch mechanism.

The forgoing objects are accomplished, according to the present invention, by providing a particularly constructed transfer apparatus for a vehicle. The transfer apparatus includes an input shaft fixedly connected to pinion shafts for mounting pinion gears, which mesh with first and second differential side gears. The first differential side gear and a first output shaft form a unitary body and rotate together. The second differential side gear is connected to and rotates together with an output ring for driving a second output shaft. A clutch mechanism is disposed beside the first differential side gear and connected between the first output shaft and a differential casing. The differential casing is connected to an end of the pinion shaft so as to rotate together with the pinion shaft.

According to a preferred embodiment of the invention, the output ring is disposed so as to overlap the differential casing in a radial direction of an axis of the input shaft.

In accordance with another aspect of the invention, another particular transfer apparatus includes a transfer casing, an input shaft connected to pinion shafts for mounting pinion gears, an output shaft rotatable in association with the pinion shafts via a differential side gear, a differential casing provided at ends of the pinion shafts, a clutch mechanism disposed beside the output shaft, and a bearing for supporting the differential casing at a periphery thereof.

In accordance with yet another aspect of the invention, another particular transfer apparatus includes an input shaft connected with pinion shafts for mounting pinion gears, a differential casing provided at ends of pinion shafts, a bearing for supporting the differential casing at a periphery thereof in the vicinity of the end of the pinion shaft, and an output ring disposed adjacent to the periphery of the differential casing and connected operationally between an output shaft and a differential side gear in mesh with the pinion gears.

In accordance with yet another aspect of the invention, a particular apparatus includes an input shaft connected to pinion shafts for mounting pinion gears meshing with differential side gears, a first output shaft forming a unitary body together with one differential side gear, and an output portion, for driving a second output shaft, forming another differential side gear and having an extending portion supported by the first output shaft.

BRIEF DESCRIPTION OF THE DRAWINGS

The above and other objects and features of the present invention will be apparent to those skilled in the art from the following description of preferred embodiments thereof when considered in conjunction with the drawings, in which:

FIG. 2 shows a position of a control sleeve in a high speed four-wheel-drive mode; FIG. 3 shows a position of the control sleeve in a neutral mode; FIG. 4 shows a position of the control sleeve in a low speed four-wheel-drive mode; and FIG. 5 shows a position of the control sleeve in a rigid mode;

DETAILED DESCRIPTION OF THE PREFERRED EMBODIMENTS

Figure 1:
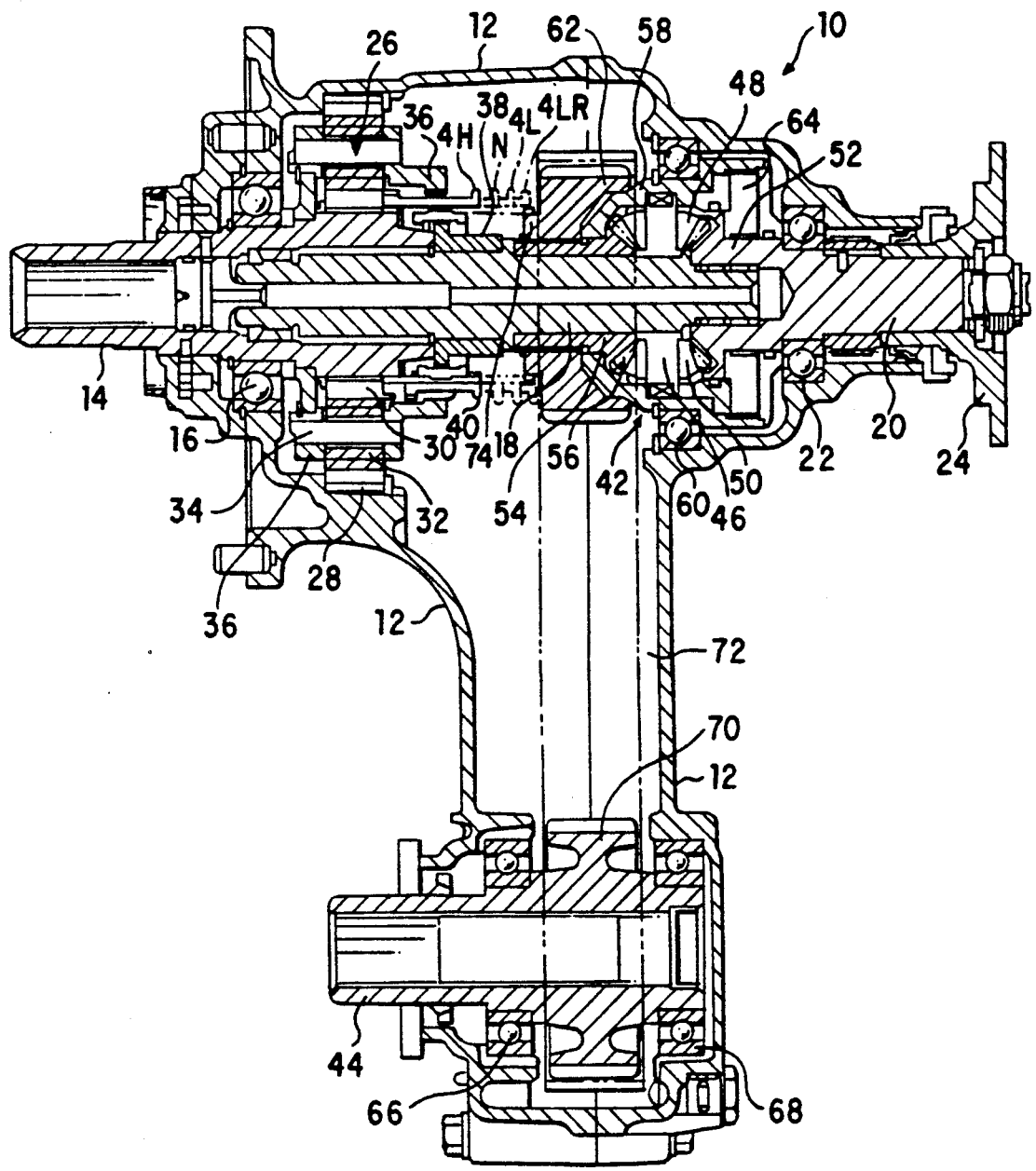
FIG. 1 is a sectional view, through an axis of an input shaft, of a transfer apparatus according to a preferred embodiment of the present invention.

Referring to FIGS. 1 to 5, a transfer apparatus, according a first preferred embodiment of the present invention, is shown and is generally indicated by reference number 10. The transfer apparatus 10 has a transfer casing 12, which is attached to a transmission casing of the vehicle engine. In the transfer casing 12, a drive shaft 14, extending from a transmission, is inserted. The drive shaft 14 is supported inside of the transfer casing 12 by a bearing 16 so as to be rotatable. The drive shaft 14 is formed so that it has a hollow structure. An input shaft 18, one end of which is inserted inside of the hollow structure of the drive shaft 14, is provided. The input shaft extends coaxially with the drive shaft 14 and is supported so as to be rotatable.

On a rear side of the transfer casing 12, opposite to the front side at which the drive shaft 14 is located, one output shaft 20 is inserted so as to be coaxial with the drive shaft 14. The output shaft 20 forms a first output shaft for driving the front wheels and is supported so as to be rotatable inside of the transfer casing 12 by a bearing 22. The output shaft 20 is connected to a propeller shaft for rear wheels via a connecting flange 24 in order to transmit drive power to the rear wheels. At an inner end of the output shaft 20 which has been inserted into the transfer casing 12, a hole for receiving the other end of the input shaft 18 is formed. The other end of the input shaft 18 is supported by the hole so as to be rotatable. More particularly, the input shaft 18 is provided in the transfer casing 12 and mounted so that both ends of the input shaft 18 are supported by the drive shaft 14 and the output shaft 20, respectively, so that the input shaft 18 is rotatable.

The drive shaft 14 is connected to the input shaft 18 via a planetary gear mechanism, of single pinion type, forming a transmission mechanism. The planetary gear mechanism has a well known structure, and includes a ring gear 28 formed on the inner surface of the transfer casing 12, a sun gear 30 formed at an outer surface of the drive shaft 14 and serving as a high speed output portion, a plurality of planetary gears 32 provided between the ring gear 28 and the sun gear 30 and meshing with them simultaneously and regularly, a carrier 36, mounted at the periphery of the drive shaft 14 so as to be rotatable, securing both ends of planetary gear shafts 34 for supporting the planetary gears 32 so as to be rotatable, and serving as a low speed output portion, a connecting sleeve 38, arranged at the outer periphery of the input shaft 18 and rotating together with the input shaft 18, and a control sleeve 40 for selectively transmitting rotation of the carrier 36 and the drive shaft 14 to the connecting sleeve 38 or the input shaft 18.

The control sleeve 40 is loosely fitted on the outer periphery of the connecting sleeve 38. The control sleeve 40 is mounted so as to be able to slide in the axial direction of the input shaft 18. The control sleeve 40 is connected to the connecting sleeve 38 by a spline so as to rotate together with the connecting sleeve 38. The control sleeve 40 is located between the drive shaft 14 and the carrier 36 in the radial direction of the input shaft 18. By sliding in the axial direction, the control sleeve 40 is selectively connected to either the outer periphery of the drive shaft 14 by the inner periphery of the control sleeve 40 or the inner periphery of the carrier 36 by the outer periphery of the control sleeve 40.

Figure 2:
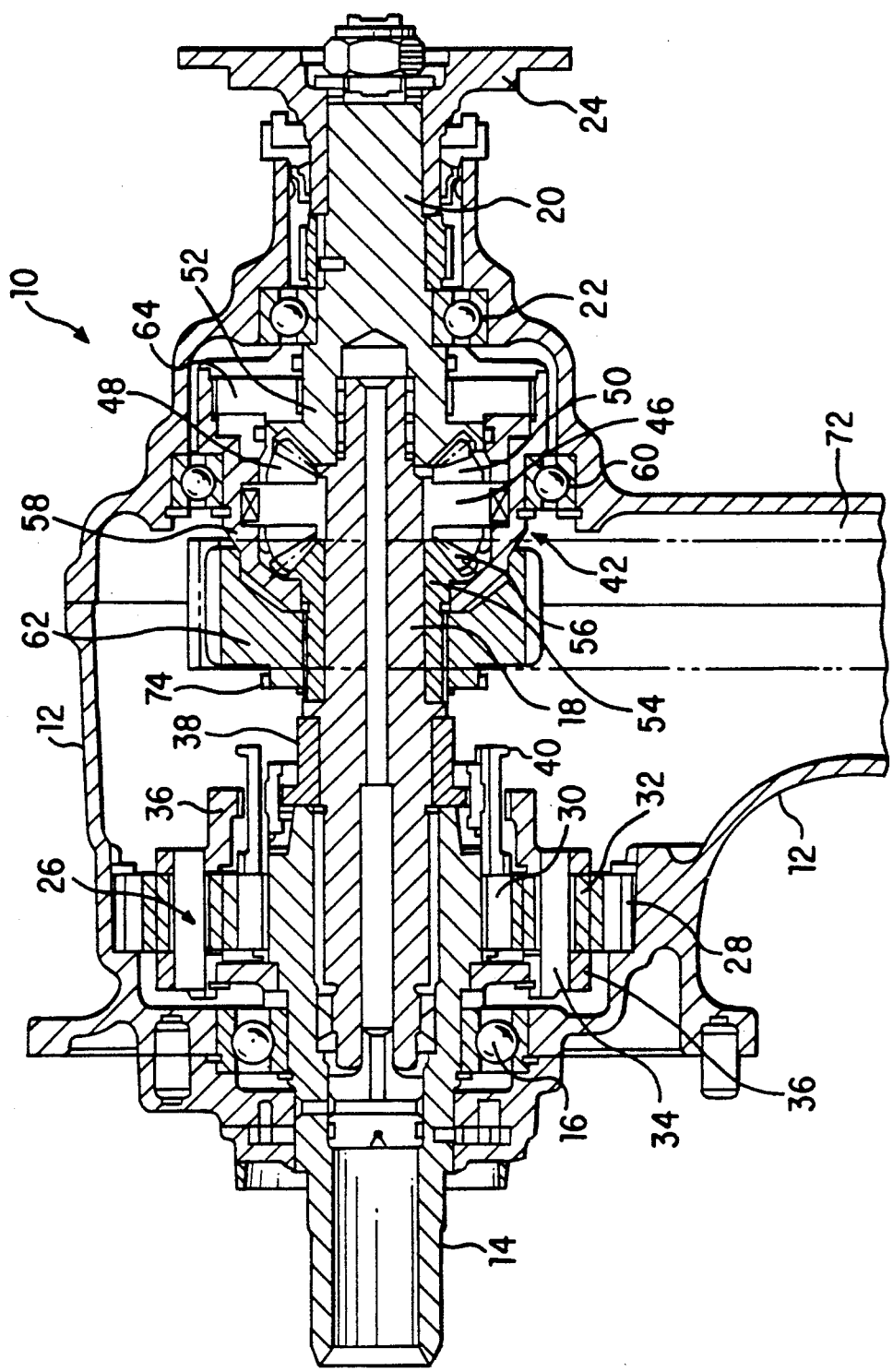
FIGS. 2, 3, 4 and 5 are sectional views of the transfer apparatus shown in FIG. 1.
Figure 3:
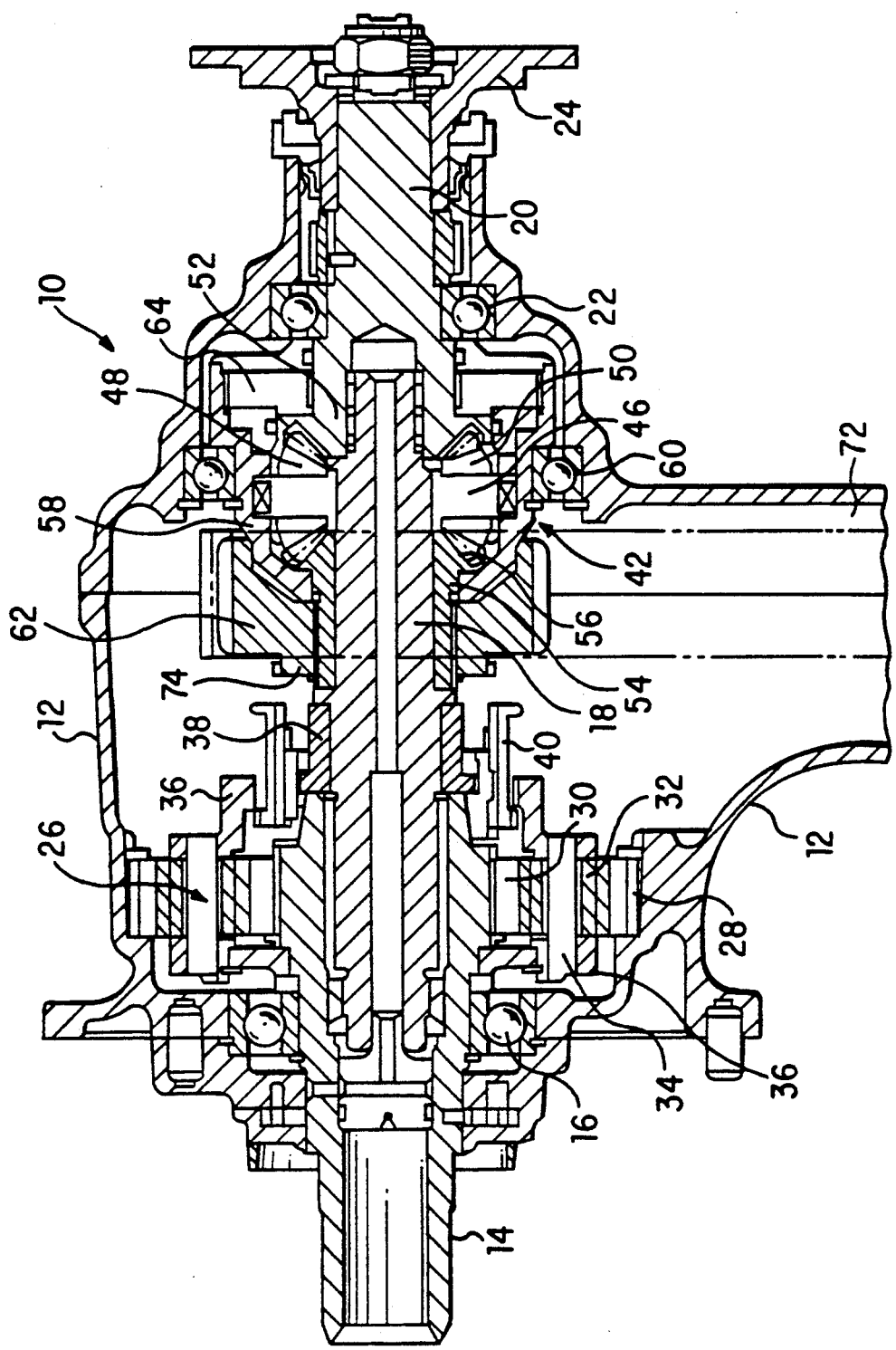

The control sleeve 40 is structured so that it slides in the axial direction when the driver of the vehicle controls or operates a switching lever (not shown). When the driver selects a high speed four-wheel-drive mode (4H mode) by using the switching lever, the control sleeve 40 is shifted to the leftmost position, as shown in FIG. 2. Since the inner periphery of the control sleeve 40 is connected to the outer periphery of the drive shaft 14, the drive power of the drive shaft 14 is transmitted to the input shaft 18 via the control sleeve 40. When the driver selects a neutral mode (N mode) with the switching lever, the control sleeve 40 is positioned so that the control sleeve 40 is connected neither to the outer periphery of the drive shaft 14 nor to the inner periphery of the carrier 36. The position of the control sleeve 40 in this mode is shown in FIG. 3. Therefore, no drive power is transmitted from the drive shaft 14 to the input shaft 18.

Figure 4:
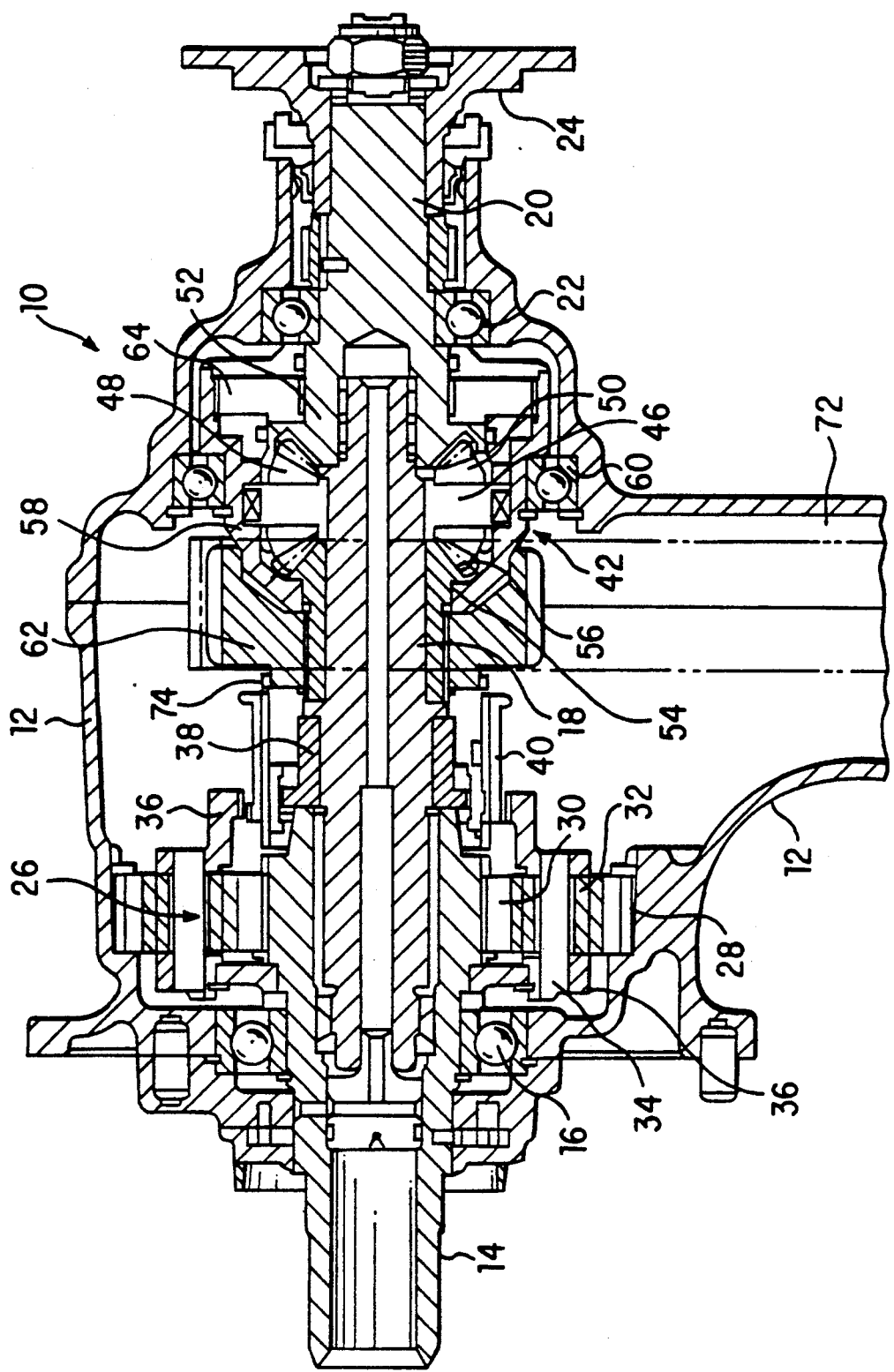
Figure 5:
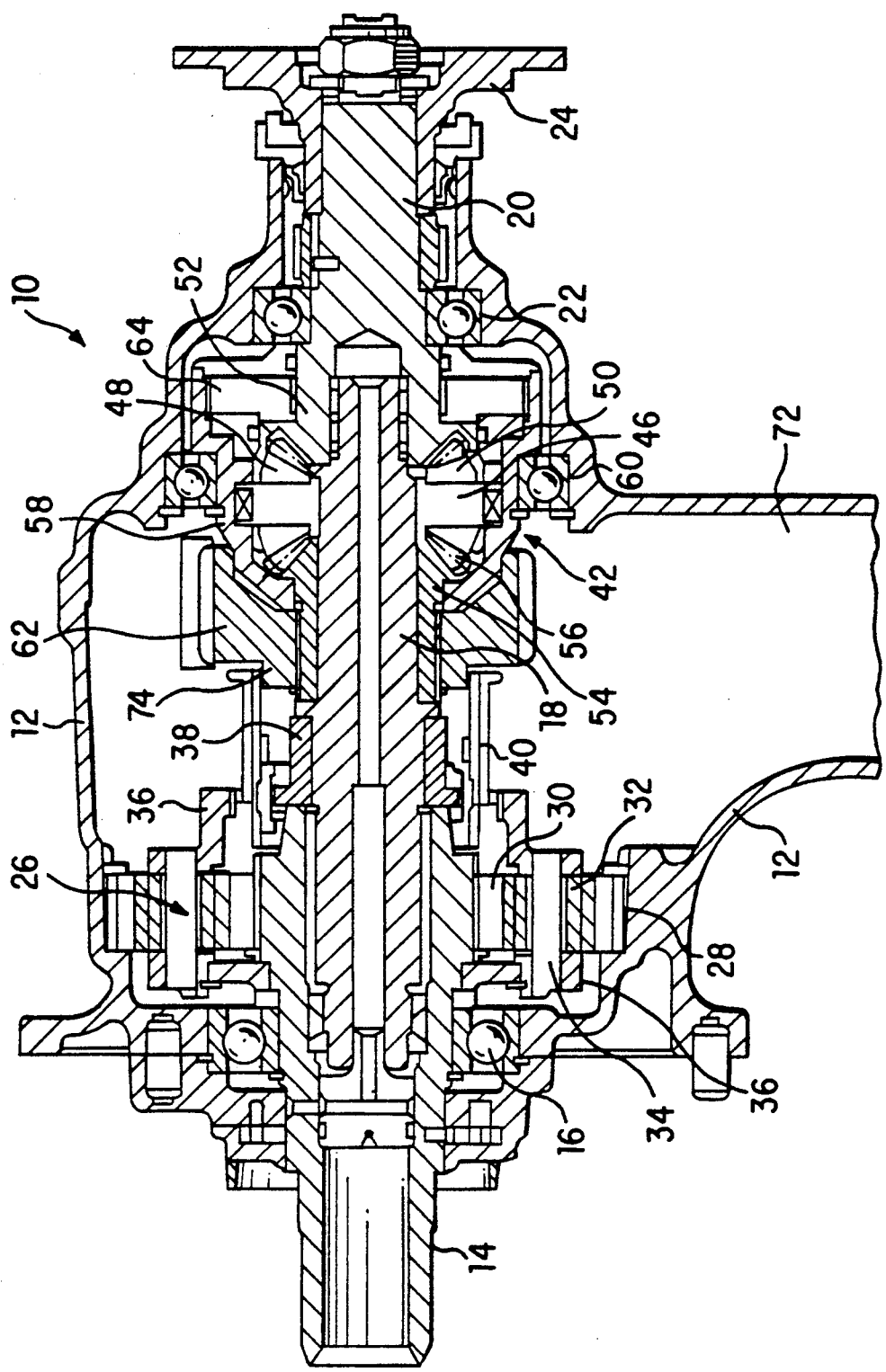

On the other hand, when the driver selects a low speed four-wheel-drive mode (4L mode) by operation of the switching lever, the control sleeve 40 is shifted to the right and into the position shown in FIG. 4. The outer periphery of the control sleeve 40 is connected to the inner periphery of the carrier 36. Consequently, the drive power of the drive shaft 14 is transmitted to the input shaft 18 via the carrier 36 and with a proper reduction. Moreover, when the driver selects a rigid mode in a low speed four-wheel-drive (4LR mode) by operation of the switching lever, the control sleeve 40 is shifted to its rightmost position as shown in FIG. 5. While the control sleeve 40 remains connected to the inner periphery of the carrier 36 via the outer periphery thereof, the inner periphery of the control sleeve 40 is connected to the periphery of a boss portion 74 of a driving sprocket 62 for transmitting drive power to the front wheels, as will be described later. Therefore, the output of the carrier 36 is directly transmitted to the sprocket 62, which forms an output ring. By selecting the rigid mode, the drive power of the engine is directly transmitted to the front wheels of the vehicle by a mechanical connection and without passing through a differential mechanism, which will be described later.

Thus, the transfer apparatus 10 is constructed so that the drive power of the input shaft 18, which is rotatively driven by the drive shaft 14 via the planetary gear mechanism 26, is transmitted to the front and rear wheels. One portion of the "divided" drive power is transmitted to the rear wheels through a bevel gear type center differential mechanism 42, provided at the one end of the output shaft 20, which is supported so as to be rotatable as mentioned above, and is transmitted through the output shaft 20. The other portion of the divided drive power is transmitted to the front wheels through the other output shaft 44 which will be described later. The structure of the center differential mechanism 42 will now be described in detail.

Referring again to FIG. 1, the center differential mechanism 42 may be seen to include a plurality of pinion shafts 46 secured to one end of the input shaft 18 adjacent to the inner end of the output shaft 20, into which the input shaft 18 is inserted coaxially. The pinion shafts 46 extend in the radial direction relative to the axis of the input shaft 18. One end of each pinion shaft 46 is fixed to the input shaft 18, and the other end of each pinion shaft 46 projects radially outwardly from the outer periphery of the input shaft 18. As shown in FIG. 1, the pinion shafts 46 have differential pinions 48 and 50 which are formed as bevel gears having relatively small diameters. The differential pinions are mounted so as to be rotatable around respective pinion shafts. At the inner end of the output shaft 20, namely, at the end at which the input shaft 18 is supported so as to be rotatable, a differential side gear 52, forming a first differential side gear, is formed as a unitary body together with the output shaft 20. The differential side gear 52 is a bevel gear which is relatively large in diameter. The differential side gear 52 simultaneously meshes with both of the differential pinions 48 and 50 on the right or rear sides thereof as shown in FIG. 1. Thus, drive power from the input shaft 18 is sequentially transmitted to the output shaft 20 through the pinion shafts 46 and the engagement between the differential pinions 48 and 50 and the differential side gear 52.

At the periphery of the input shaft 18 adjacent to the pinion shafts 46, on the left or front side thereof as shown in FIG. 1, an output sleeve 54 is attached to and coaxial with the input shaft 18 so as to be rotatable. At an end of the output sleeve 54 near the output shaft 20, another differential side gear 56, forming a second differential side gear, is formed together, as a unitary body, with the output sleeve 54. The differential side gear 56 is a bevel gear which is relatively large in diameter, and simultaneously meshes with both of the differential pinions 48 and 50 on the front side thereof.

Radially outer ends of the pinion shafts 46 are fixedly supported by the inner surface of a differential casing 58, so that the differential casing 58 is able to rotate together with the pinion shafts 46 around the axis of the input shaft 18. The differential casing 58, on the front side thereof, is constructed so that its diameter is gradually decreased as it goes to a front end of the differential casing 58. At the front end of the differential casing 58, the casing encloses the outer periphery of the output sleeve 54 so as to enable the output sleeve 54 to slide. On its rear side, the differential casing 58 extends, from a location at which the ends of the pinion shafts 46 are secured, to rear end of the differential casing, parallel to and coaxially with the output shaft 20. Accordingly, the differential casing 58 provides a space for a clutch mechanism between the inner periphery of the differential casing 58 and the outer periphery of the output shaft 20 on its rear side.

The differential casing 58 is supported in the transfer casing 12 by a bearing 60 so that the differential casing is rotatable around the axis of the input shaft 18. The bearing 60 is provided between the outer periphery of the differential casing 58 and the inner periphery of the transfer casing 12. The differential casing 58 is supported by the bearing 60 so as to be rotatable around the axis of the input shaft 18. The bearing 60 is located at the outer periphery of the differential casing 58 adjacent to or corresponding with the inner periphery of the differential casing 58 at the location at which the pinion shafts 46 are supported. As a result, the input shaft 18, provided with the pinion shafts 46, is supported against the transfer casing 12 by the bearing 60 so as to be rotatable. The one end of the input shaft 18 is inserted in and supported by the end of the output shaft 20 so as to be rotatable. Therefore, the input shaft 18 is supported in a very stable manner.

A driving sprocket 62 forming an output ring is connected to the outer periphery of the output sleeve 54 by a spline so as to rotate together with the output sleeve 54. The inner periphery of the sprocket 62 is connected to the outer periphery of the output sleeve 54 by a spline on a front side thereof. The sprocket is formed so as to be fitted to the outer periphery of the differential casing 58 at a rear portion thereof. The sprocket 62 is supported so that it is able to slide on the outer periphery of the differential casing 58 at a rear end thereof. Accordingly, the sprocket 62 is set to overlap the outer periphery of the differential casing 58. By using such an overlapping structure, it is possible to reduce the length of the input shaft 18 in the axial direction. As a result, a transfer apparatus having an overall compact length in the axial direction is obtained.

As mentioned above, at the rear end of the differential casing 58, a space is produced between the inner periphery of the differential casing 58 and the outer periphery of the output shaft 20. In this space, a viscous coupling 64, forming a clutch means, is provided for limiting differences between rotations of the differential casing 58 and the output shaft 20.

The viscous coupling 64 is disposed beside the output shaft 20 and is arranged on a rear side of the differential side gear 52 as shown in FIG. 1. The viscous coupling 64 is covered by the differential casing 58. On the other hand, the sprocket 62 is arranged at the left side, i.e., a front side, of the differential side gear 56, as shown in FIG. 1. The sprocket 62 is provided so that the sprocket 62 overlaps the outer periphery of the differential casing 58, the diameter of which is gradually reduced. Since the viscous coupling 64 and the sprocket 62 are arranged on both sides of the pinion shafts 46, a compact layout of the viscous coupling 64 and the sprocket 62 is achieved.

The output shaft 44 forms a second output shaft for transmitting the drive power from the engine to the front wheels and is supported so as to be rotatable around the axis of the output shaft 44 by a pair of bearings 66 and 68. The output shaft 44 is supported in the transfer casing 12 so as to be spaced from the input shaft 18. At an outer periphery of the output shaft 44, a driven sprocket 70 is formed as a unitary body and coaxially with the output shaft 44. Between the driven sprocket 70 and the driving sprocket 62, an endless belt 72, having teeth, is operationally connected.

The drive power from the input shaft 18 is sequentially transmitted to the output shaft 44 via the pinion shafts 46, engagement between the pair of the differential pinions 48 and 50 and the differential side gear 56, the output sleeve 54, the driving sprocket 62, the endless belt 72, and the driven sprocket 70.

At a front or left end of the driving sprocket 62 shown in FIG. 1, near the planetary gear mechanism 26, a boss portion 74 is formed so as to extend toward the front side of the casing 12. The boss portion has a cylindrical shape and is formed as a unitary body with the driving sprocket 62. The outer periphery of the boss portion 74 is structured so as to connect, by a spline, with the right end (viewing FIG. 1) of the inner periphery of the control sleeve 40. Therefore, as mentioned above, when the driver selects a rigid mode during low speed, four-wheel-drive mode (4LR mode) by operation of the switching lever, the control sleeve 40 is shifted to the rightmost position as shown in FIG. 5. While the control sleeve 40 remains connected to the inner periphery of the carrier 38 via the outer periphery thereof, the inner periphery of the control sleeve 40 is connected to the periphery of the boss portion 74 formed at the front end of the driving sprocket 62. Accordingly, the output of the carrier 36 is directly transmitted to the driving sprocket 62. Upon selection of the rigid mode, therefore, the drive power of the engine is directly transmitted to the front wheels by a mechanical connection and without passing through the center differential mechanism 42.

If it is necessary to force the front wheels of the vehicle to rotate, for example, during inspections by authorities or car care clinics, rotation of the front wheels is easily performed. In the transfer apparatus 10, the control sleeve 40 for controlling or switching output from the planetary gear mechanism 26 between high and low speeds is used as a lock member for locking the center differential mechanism 42. In addition, the transfer apparatus 10 is compact as compared to a conventional transfer apparatus equipped with a lock mechanism for locking a center differential mechanism and a transmission mechanism.

Figure 6:
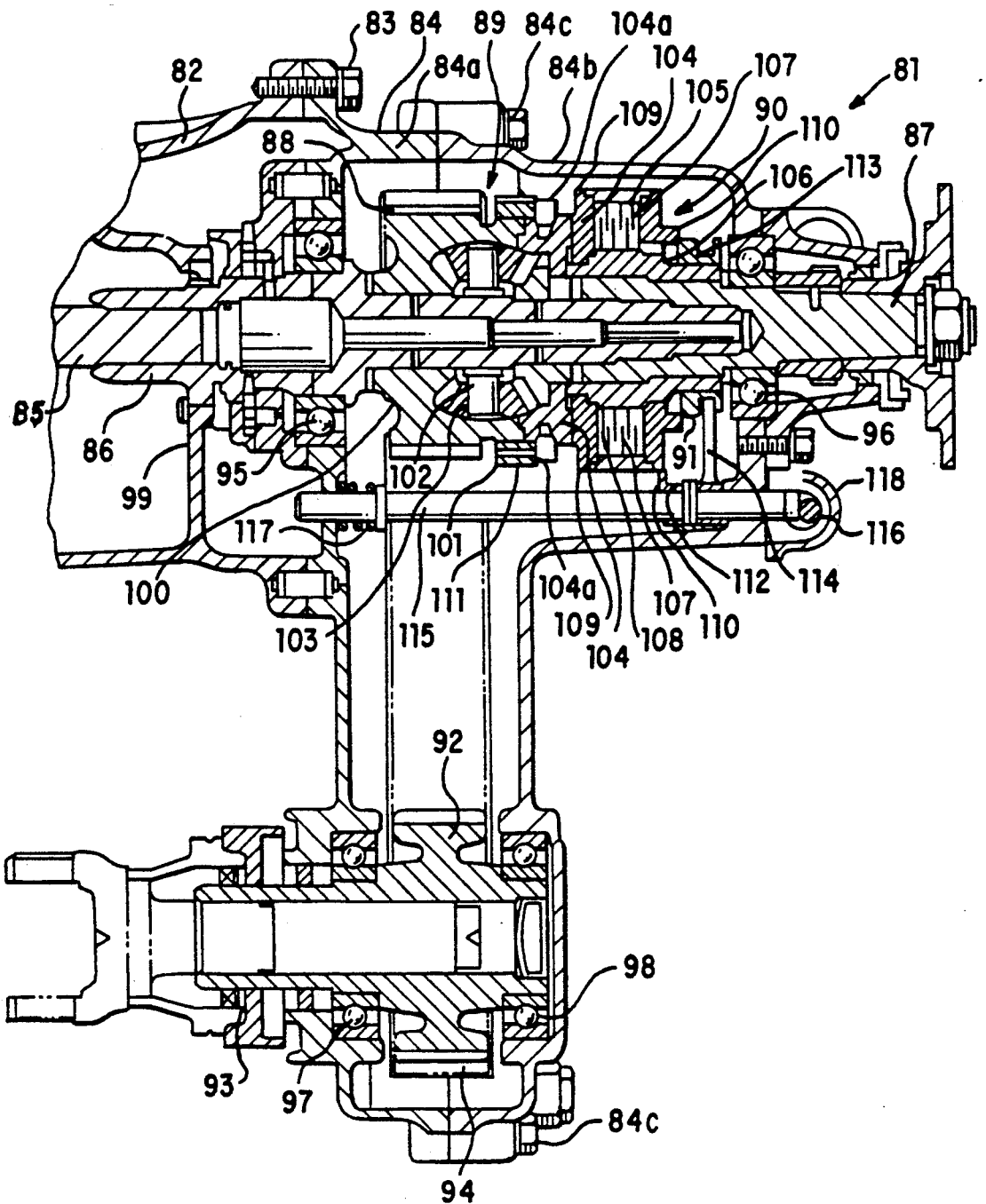
FIG. 6 is a sectional view of a transfer apparatus, through an axis of an input shaft, according to another preferred embodiment of the present invention.
Figure 7:
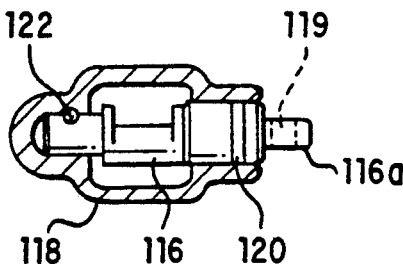
FIG. 7 is a sectional view showing a cam mechanism in a differential lock mechanism of the transfer apparatus shown in FIG. 6.

Referring now to FIGS. 6 and 7, a transfer apparatus according to another preferred embodiment of the present invention is shown and is generally indicated by reference number 81. The transfer apparatus 81 is provided in a vehicle for transferring drive power of the engine to front and rear wheels of the vehicle. The transfer apparatus 81 is arranged in a transfer casing 84, which is connected, by bolts 83, to a transmission casing 82 provided at an output side of the transmission (not shown).

A rear end of a drive or output shaft 85 of the transmission is inserted in the transfer apparatus 81 from its front side. An input shaft 86, having a hollow structure, is connected to the rear end of the drive shaft 85 by a spline. The input shaft 86 is supported in the transfer apparatus 81 so as to be rotatable. At a rear end of the input shaft 86, an output shaft 87 for the rear wheels is provided as a first output shaft and extends to the rear side of the transfer apparatus. The drive shaft 85, the input shaft 86 and the output shaft 87 are arranged coaxially with each other in the transfer casing 84. The transfer casing 84 is formed by two parts, namely, a front portion 84a and a rear portion 84b, which can be separated in an axial direction of the shafts 85, 86 and 87. The front portion 84a and the rear portion 84b are connected by bolts 84c. In addition, an oil seal 99 is provided at a front end of the input shaft 86 in the transmission casing 82.

The transfer apparatus 81 includes a sprocket 88 for driving the front wheels and forming an output portion, a bevel gear type differential mechanism 89, a differential limit mechanism 90 forming a multi-plate clutch type viscous coupling, and a differential lock mechanism 91 for locking the differential mechanism. The sprocket 88 and mechanisms 89, 90 and 91 are arrayed in the axial direction of the input shaft 86 and disposed in this order from the transmission side of the transfer apparatus. In the transfer casing 84, an output shaft 93 for driving the front wheels is arranged so as to extend parallel to the drive shaft 85. The sprocket 88 is coaxial with the input shaft 86. This sprocket 88 and a sprocket 92, provided on the output shaft 93, are operationally connected to each other by a chain 94.

The input shaft 86 is supported by a bearing 95 of a ball bearing type provided on the front portion 84a of the transfer casing 84. The output shaft 87 for driving the rear wheels, which is arranged coaxially with the input shaft 86, is supported by a bearing 96 provided at the rear portion 84b of the transfer casing 84. The output shaft 93 is supported by bearings 97 and 98 provided at both sides of the sprocket 92 in the transfer casing 84.

The differential mechanism 89 uses a bevel gear system, and includes a first differential side gear 100 and a second differential side gear 101, which are arranged coaxially with the input shaft 86 so as to be opposed to each other. The first differential side gear 100 is formed together with the sprocket 88 as a unitary body. The second differential side gear 101 is formed together with the output shaft 87 as a unitary body at a front end of the output shaft 87. Between the first differential side gear 100 and the second differential side gear 101, pinion gears 103, supported by pinion shafts 102, are provided and mesh with both of the differential side gears 100 and 101. The pinion shafts 102 are fixedly connected to the input shaft 86 by a spline, so that rotary power from the input shaft 86 is transmitted to the pinion shafts 102.

The sprocket 88, including the first differential side gear 100, has a cylindrical body which is penetrated by the input shaft 86 at a center thereof. The cylindrical body is supported by the input shaft 86 so as to be rotatable relative to the input shaft 86. A teethed portion of the sprocket 88 is formed radially outwardly of the teethed portion of the first differential side gear 100, so that the teethed portions overlap as shown in FIG. 6. The teethed portion of the sprocket 88 extends rearwardly, over the teethed portion of the first differential side gear 100, to the vicinity of the center axis of the pinion shafts 102. The cylindrical body forming the sprocket 88 and the first differential side gear 100 extends rearwardly and has a curved form corresponding to the outline of the pinion gears.

At a rear end of the cylindrical body, an extending portion 104 having a ring shape is provided so as to extend rearwardly from the cylindrical body. A front end of the extending portion 104 is combined with the rear end of the cylindrical body via bolts 104a. A rear end of the extending portion 104 extends behind the second differential side gear 101. The extending portion 104 is supported by the output shaft 87 so as to be rotatable. Therefore, a combined structure including the cylindrical body formed by the sprocket 88, the first differential side gear 100, and the extending portion 104, form a rotary body having an arch shaped section. The rotary body forms a differential casing for the differential mechanism 89, covering the pinion shafts 102, the pinion gears 103, and the second differential side gear 101. In this case, the cylindrical body forming a front portion of the rotary body is supported by the input shaft 86 so as to be rotatable. The extending portion 104 forming a rear portion of the rotary body is supported by the output shaft 87 so as to be rotatable. As a result, the rotary body, forming the differential casing and having an arch shaped section, is stably supported at both the front and rear ends.

The differential limit mechanism 90 is provided adjacent to the rear end of the differential mechanism 89. The differential limit mechanism 90 includes an outer cylinder portion 105 and an inner cylinder portion 106, which are arranged coaxially and opposed to each other. At an inner surface of the outer cylinder portion 105, a plurality of ring shaped clutch plates 107 are arranged in predetermined spaces in the axial direction of the input shaft 86. Similarly, at an outer surface of the inner cylinder portion 106, a plurality of ring shaped clutch plates 108 are arranged in predetermined spaces so that the clutch plates 108 are located between the clutch plates 107 of the outer cylinder portion 105. The clutch plates 107 and 108 of the outer and inner cylinder portions 105 and 106 are arrayed alternatively and in an overlapping relation. At front and rear ends of the outer cylinder portion 105, ring shaped plates 109 and 110 are attached, respectively. At inner ends of the plates 109 and 110, sealing members 111 and 112 are provided, respectively. The plates 109 and 110 contact the outer periphery of the inner cylindrical portion 106 via sealing members 111 and 112. Thus a space between the outer and inner cylindrical portions 105 and 106, in which the clutch plates 107 and 108 are provided, is closed. Viscous coupling is accomplished by a viscous fluid packing in the closed space.

In this case, the front plate 109 of the outer cylinder portion 105 has a spline. The front plate 109 is connected to the outer periphery of the extending portion 104 by the spline formed thereon. Therefore, rotary power of the rotary body is transmitted from the extending portion 104 to the outer cylinder portion 105. On the other hand, the inner cylinder portion 106 is connected to the output shaft 87 for the rear wheels by a spline, so that the inner cylinder portion 106 rotates together with the output shaft 87.

The differential lock mechanism 91 is provided adjacent to a rear end of the differential mechanism 90. The differential lock mechanism 91 includes a sleeve 113 connected by a spline to a portion extending rearwardly from the rear end of the inner cylindrical portion 106 of the differential mechanism 90, a shift fork 114 having one end which is connected to the sleeve 113 so a to shift in the axial direction, and a rod 115 extending parallel to the axial direction of the input shaft 86 and supporting the other end of the shift fork 114. The rod 115 is supported at both ends by the transfer casing 84 so as to enable shifting in the axial direction. A cam portion 116 is connected to a rear end of the rod 115. A coil spring 117 is attached to the rod 115 so as to push the rod 115 rearwardly, i.e., towards the right in FIG. 6. The coil spring 117 is provided in a compressed state between the inner surface of the transfer casing 84 and a flanged portion of the rod 115.

At the outer periphery on the front side of the sleeve 113, an outer spline is provided so as to connect with an inner spline formed at the rear end of the rear plate 110 of the outer cylindrical portion 105 of the differential limit mechanism 90. The sleeve 113 is not connected to the outer cylindrical portion 105 by a spline when in the position shown in FIG. 6. Therefore, the outer cylindrical portion 105 and the inner cylindrical portion 106 are rotatable relative to each other. In other words, the differential lock mechanism 91 does not perform a locking operation. If the sleeve 113 is shifted to the front side, or to the left in FIG. 6, and is coupled to the outer cylindrical portion 105 by a spline, the outer and inner cylinder portions 105 and 106 of the differential mechanism 90 are fixed to each other. In this case, the differential lock mechanism 91 performs a locking operation.

As seen from both FIGS. 6 and 7, the cam portion 116 is mounted in a casing 118. The casing 118 extends from the transfer casing 84, and supports the cam portion 116 so that it is rotatable. The cam portion 116 is supported at both of its ends, between which a cam for contacting an end of the rod 115 is provided. One end of the casing 118 has a opening, from which one end of the cam portion 116 juts out so as to form a control portion 116a. In order to be properly coupled to a control member, a through hole 119 is provided at the control portion 116a. At a bearing adjacent to the control portion 116a, a ring shaped oil seal 120 is provided between an inner surface of the casing 118 and an outer surface of the cam portion 116. At another bearing, opposite the bearing adjacent to the control portion 116a, a pin 122 is inserted between an inner surface of the casing 118 and an outer surface of the cam portion 116, so that the cam portion 116 is held at a predetermined position in the casing 118. The cam at the cam portion 116 is structured asymmetrically relative to the axis of rotation of the cam portion 116. Therefore, the rod 115 shifts in the axial direction of the input shaft 86 in accordance with rotation of the cam. In response to the movement of the rod 115 via the shift fork 114, the sleeve 113 moves in the axial direction between the locking position and the unlocking position of the differential lock mechanism 91.

In operation, drive power from the engine is transmitted to the drive shaft 85 of the transmission through the transmission. The drive power is further transmitted to the input shaft 86 of the differential mechanism 89, which is connected to the drive shaft 85 by a spline. The drive power supplied to the input shaft 86 is transmitted to the pinion shafts 102 connected to the input shaft 86 by a spline. The pinion shafts 102 and the pinion gears 103 are rotated around the axis of the input shaft 86 by this drive power. Since the pinion gears 103 mesh with the first and second differential side gears 100 and 101, both the first and second differential side gears 100 and 101 are driven so as to rotate around the axis of the input shaft 86 by the rotation of the pinion shafts 102. Rotation of the first differential side gear 100 is equivalent to rotation of the sprocket 88, because the first differential side gear 100 is formed as a unitary rotary body together with the sprocket 88. The rotation of the sprocket 88 is transmitted to the sprocket 92 through the chain 94. The chain 94 rotates the output shaft 93 for the front wheels.

The drive power transmitted to the second differential side gear 101 is transmitted to the output shaft 87, which is formed as a unitary body with the second differential side gear 101 and drives the rear wheels.

The outer cylindrical portion 105 of the differential limit mechanism 90 is connected to the extending portion 104, which is made rotatable together with the sprocket 88 and the first differential side gear 100 by a spline. Therefore, the outer cylindrical portion 105 is rotated by the drive power for front wheel drive system. On the other hand, the inner cylindrical portion 106 of the differential limit mechanism 90 is connected to the output shaft 87 for the rear wheels by a spline. Accordingly, the inner cylindrical portion 106 is rotated by the drive power for the rear wheel drive system. If a rotation differential between the outer and inner cylindrical portions 105 and 106 becomes large, friction among the clutch plates 107, 108 and the viscous fluid provided therebetween becomes large. This results in suppression of the growth of a rotation differential between the front and rear wheel drive systems. As a result, a differential limiting action by the differential limit mechanism 90 is effectively provided.

Moreover, by rotating a proper control member inserted in the through hole 119 of the cam portion 116, the rod 115 is shifted forward, i.e., to the left, from the position shown in FIG. 6 and compresses the spring 117. Therefore, the sleeve 113 is shifted towards the front side of the transfer apparatus 81 by the shift fork 114. This causes the sleeve 113 to be connected to the outer cylindrical portion 105 by a spline. Accordingly, the differential limit mechanism 90 enters into a locking mode, in which relative rotation between the outer and inner cylindrical portion 105 and 106 is prevented. As a result, no relative rotation between the input shaft 86 and the output shaft 87 for the rear wheels is produced, and the drive power of the engine is transmitted to the output shaft 87, forming a first output shaft for driving the rear wheels, and to the sprocket 88, forming an output ring for driving the front wheels, in a differential locking state.

It is to be understood that although the present invention has been described in detail with respect to preferred embodiments thereof, various other embodiments and variations may occur to those skilled in the art. Those embodiments and variations which fall within the scope and spirit of the invention are intended to be covered by the following claims.

What is claimed is:

1. A transfer apparatus for a vehicle, comprising:
   an input shaft rotatively driven by drive power from an engine of said vehicle;
   pinion shaft means for mounting pinion gearing so that said pinion gearing is rotatable, said pinion shaft means mounted on said input shaft so as to rotate together with said input shaft;
   first and second differential side gears meshing with said pinion gearing;
   a first output shaft, forming a unitary body together with the first differential side gear, rotatively driven in association with rotation of said pinion shaft means;
   a differential casing connected to said pinion shaft means so as to rotate together with said pinion shaft means;
   a viscous coupling, disposed on one side of said first differential side gear, selectively connecting said differential casing and said first output shaft;
   a driving sprocket connected to the second differential side gear so as to rotate together therewith, said driving sprocket overlapping and slidable on an outer periphery of said differential casing; and
   a second output shaft rotatively driven in association with rotation of said driving sprocket.

2. A transfer apparatus according to claim 1, and further comprising a transfer casing and bearing means, disposed in said transfer casing, for supporting said differential casing at a periphery of said differential casing near said pinion shaft means so as to enable said differential casing to rotate relative to said transfer casing.

3. A transfer apparatus according to claim 1, and further comprising an output sleeve coupling said input shaft with said second differential side gear.

4. A transfer apparatus according to claim 3, wherein said first output shaft drives rear wheels of said vehicle and said second output shaft drives front wheels of said vehicle.

5. A transfer apparatus according to claim 1, wherein said pinion shaft means includes at least one pinion shaft extending radially outward from said input shaft, said pinion gearing includes at least one beveled pinion gear provided at each pinion shaft, and each of said first and second differential side gears is a bevel gear disposed coaxially with said input shaft and in mesh with said at least one beveled pinion gear.

6. A transfer apparatus according to claim 5, wherein said first output shaft and said driving sprocket are disposed coaxially with said input shaft.

7. A transfer apparatus according to claim 6, wherein said first output shaft supports one end of said input shaft so that it is rotatable.

8. A transfer apparatus according to claim 5, wherein said differential casing and said viscous coupling are disposed coaxially with said input shaft.

9. A transfer apparatus according to claim 1, wherein said viscous coupling is mounted on said output shaft and is covered by said differential casing.

10. A transfer apparatus according to claim 1, wherein said second output shaft is spaced from said driving sprocket and is disposed so that the axial direction of said second output shaft is parallel to the axial direction of said input shaft, and said second output shaft is driven by a belt coupling said second output shaft and said driving sprocket.

11. A transfer apparatus for a vehicle, comprising:
    a transfer casing;
    an input shaft, mounted in said transfer casing, rotatively driven by drive power from an engine of said vehicle;
    pinion shaft means for mounting pinion gearing so that said pinion gearing is rotatable, said pinion shaft means mounted on said input shaft so as to rotate together with said input shaft;
    a differential side gear meshing with said pinion gearing;
    an output shaft, forming a unitary body together with said differential side gear, rotatively driven in association with rotation of said pinion shaft means;
    a differential casing connected to said pinion shaft means so as to rotate together with said pinion shaft means;
    a viscous coupling, disposed on one side of said differential side gear, mounted on said output shaft and covered by said differential casing, said viscous coupling selectively connecting said differential casing and said output shaft; and
    bearing means, disposed in said transfer casing, for supporting said differential casing at a periphery of said differential casing near said pinion shaft means so as to enable said differential casing to rotate relative to said transfer casing.

12. A transfer apparatus for a vehicle, comprising:
    a transfer casing;
    an input shaft, mounted in said transfer casing, rotatively driven by drive power from an engine of said vehicle;
    pinion shaft means for mounting pinion gearing so that said pinion gearing is rotatable, said pinion shaft means mounted on said input shaft so as to rotate together with said input shaft;
    first and second differential side gears meshing with said pinion gearing;
    a first output shaft, forming a unitary body together with the first differential side gear, rotatively driven in association with rotation of said pinion shaft means;
    a differential casing connected to said pinion shaft means so as to rotate together with said pinion shaft means;
    bearing means, disposed in said transfer casing, for supporting said differential casing at an outer periphery of said differential casing and at a location at which said pinion shaft means is mounted on said input shaft, said bearing means permitting said differential casing to rotate relative to said transfer casing;
    a driving sprocket connected with the second differential side gear so as to rotate together therewith and disposed adjacent to said periphery of said differential casing; and a second output shaft rotatively driven in association with rotation of said driving sprocket.

13. A transfer apparatus for a vehicle, comprising:

an input shaft rotatively driven by drive power from an engine of said vehicle;

pinion shaft means, mounted on said input shaft so as to rotate together with said input shaft, for providing pinion gearing;

a first differential side gear meshing with said pinion gearing;

a first output shaft, forming a unitary body together with said first differential side gear, rotatively driven in association with rotation of said pinion shaft means;

an output portion, rotatively driven around said input shaft, including a second differential side gear formed in a unitary body therewith meshing with said pinion gearing and an extending portion supported by said first output shaft;

a second output shaft rotatively driven in association with rotation of said output portion; and a viscous coupling, limiting differences between said first output shaft and said output portion, disposed on one side of said first differential side gear, said extending portion transmitting rotary power to said first output shaft through said viscous coupling.

14. A transfer apparatus according to claim 13, wherein said viscous coupling includes an outer cylinder portion which is connected to said extending portion and an inner cylinder portion which is connected to said first output shaft.

15. A transfer apparatus according to claim 14, and further comprising differential locking means for locking said viscous coupling disposed on said inner cylinder portion and on a side of said viscous coupling opposite to said first differential side gear.

16. A transfer apparatus according to claim 11, and further comprising an additional differential side gear and a driving sprocket connected to the additional differential side gear so as to rotate together therewith, said driving sprocket overlapping and slidable on an outer periphery of said differential casing.

* * * * *